(12) United States Patent
Gibb et al.

(10) Patent No.: US 6,536,905 B2
(45) Date of Patent: Mar. 25, 2003

(54) BALL DETECTION VIEWER

(76) Inventors: Robert Alexander Gibb, 115 Allen-A-Dale Lane, Quispamsis NB (CA), E2E 1H2; Thomas John Chapman, 376 Douglas Ave., Saint John NB (CA), E2K 1E7; Scott Percy Archie Leslie, 322 Eglington Ave. East, #2009, Toronto ON (CA), M4P 1L6

( * ) Notice: Subject to any disclaimer, the term of this patent is extended or adjusted under 35 U.S.C. 154(b) by 0 days.

(21) Appl. No.: 09/901,088

(22) Filed: Jul. 10, 2001

(65) Prior Publication Data

US 2002/0005936 A1 Jan. 17, 2002

(30) Foreign Application Priority Data

Jul. 14, 2000 (CA) .......................................... 2,314,137

(51) Int. Cl.[7] .............................................. G03B 21/14
(52) U.S. Cl. ......................................... 353/84; 473/353
(58) Field of Search ................... 351/163, 47; 473/353

(56) References Cited

U.S. PATENT DOCUMENTS

| | | | | | |
|---|---|---|---|---|---|
| 3,877,797 A | * | 4/1975 | Thornton, Jr. | ............... | 351/163 |
| 5,006,409 A | * | 4/1991 | Baiocchi et al. | ............... | 106/2 |
| 5,363,152 A | * | 11/1994 | Reed, III | ..................... | 351/165 |
| 5,408,278 A | * | 4/1995 | Christman | ................... | 351/163 |
| 5,592,245 A | * | 1/1997 | Moore et al. | ............... | 351/163 |
| 6,132,044 A | * | 10/2000 | Sternbergh | .................. | 351/163 |

* cited by examiner

*Primary Examiner*—Russell Adams
*Assistant Examiner*—D. Ben Esplin
(74) *Attorney, Agent, or Firm*—Mario Theriault

(57) ABSTRACT

The optical filter enhances the visual perception of a stationary white object such as a golf ball to help a user to locate the object when lost. The filter attenuates light transmission for colors having wavelengths over 500 nanometer such as the light reflected by the vegetation, and transmits colors having shorter wavelengths such as the light reflected by the ball. The filter is worn in an eyeglass frame.

1 Claim, 1 Drawing Sheet

Graphical depiction of the light blocked by the filter and the light transmitted by the filter

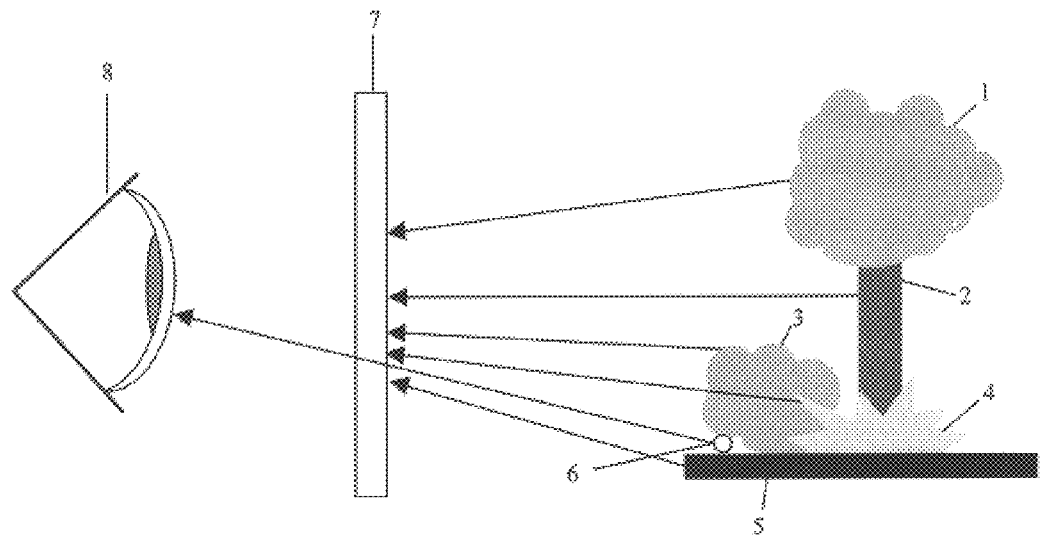
Figure 1: Graphical depiction of the light blocked by the filter and the light transmitted by the filter
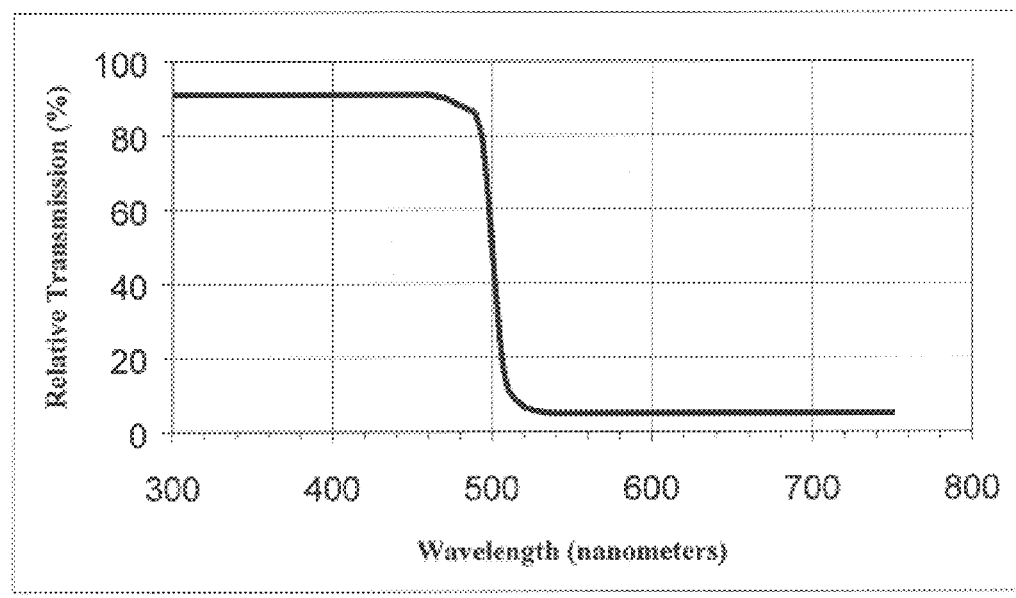
Figure 2: Filter Transmission General Characteristics

BALL DETECTION VIEWER

FIELD OF THE INVENTION

This invention relates to an optical device to aid in the finding of a white or light-colored golf ball lost to the view of a player.

BACKGROUND OF THE INVENTION

Various technologies have been proposed in the past to assist golfers in finding golf balls on a golf course or in the adjacent rough terrains. Some inventors have proposed to use a fluorescent covering on a ball and to illuminate that ball with ultraviolet light to make the ball glow. Other inventors have proposed to use the reflection of radio waves against metal plates inside a golf ball to locate the ball. Other proposals include emitters of various sorts installed inside the core of the ball. However, none of the previous devices has enjoyed a lasting success.

SUMMARY OF THE INVENTION

The present invention enhances the visual perception of a stationary white object, such as a golf ball, to help the user to locate the object. The present invention comprises an optical filter that attenuates light transmission for light rays having wavelengths longer than approximately 500 nanometer, and transmits light rays having shorter wavelengths. The present invention is advantageous for helping a golfer avoiding penalty strokes and wasted time and expenses due to lost balls. The present invention also improves golf course efficiency through the reduction of round times.

The optical filter is worn as eyeglasses. These eyeglasses constitute a relatively inexpensive, light, portable device that can be used by any player under a wide range of weather and foliage conditions. This invention can be used, without modification, to find any light-colored object in a field of vegetation or in a background that reflects different colors than the color of the object.

BRIEF DESCRIPTION OF THE DRAWINGS

FIG. 1 is a graphical representation of the invention, and

FIG. 2 illustrates the light transmission characteristics of the filter used in the present invention.

DETAILED DESCRIPTION OF THE PREFERRED EMBODIMENT

Referring firstly to FIG. 1, the light reflected from the foliage 1, tree trunks 2, undergrowth 3, grass 4, dirt or gravel 5 and the stationary object 6 to be located, in this case the ball, are represented by arrows. The filter 7 blocks most of the light reflected by the foliage 1, tree trunks 2, undergrowth 3, grass 4, dirt or gravel 5 (indicated by the arrows stopping at the filter). The filter 7 allows the light reflected by the ball 6 to pass there through (indicated by the arrow passing through the filter) and reach the eye 8 of the user.

The characteristics of the filter 7 are illustrated in FIG. 2. These characteristics are shown in the form of light transmission in percentage, for different wavelengths of light, in nanometers. The filter 7 transmits light in the blue color range and attenuates the transmission of light with wavelengths over 500 nanometer (500 nm). This filter attenuates colors most commonly found in vegetation, i.e. greens, yellows, oranges and reds; and transmits the blue and violet colors which are not reflected by vegetation but which are reflected to a much greater extent by white objects.

The degree of transmission of light through the filter 7 above 500 nm should be less than 15%, and the degree of transmission of light at wavelengths shorter than 500 nm should be more than 30%. A preferred filter 7 is a plastic filter sold by Rosco Corporation under the trade name of Roscolux #85 "Deep blue"™.

The filter 7 mentioned above is advantageous because is has a good light transmission below the 500 nm mark, a good light attenuation above the 500 nm mark, and a sharp drop in light transmission at the 500 nm mark. As can be seen in FIG. 2, the light transmission curve of the filter 7 shows a light transmission of about 90% below 500 nm and a light transmission of less than 10% above 500 nm. The light transmission curve makes a sharp drop at the 500 nm mark, showing a light transmission of 50% at that wavelength. In other words, the filter 7 blocks about 90% of the light coming from a vegetative background and blocks only less than about 10% of the light reflected from a white object.

The preferred filter 7 is mounted into a standard eyeglass frame of any design. The filter 7 could also be mounted in many different other viewing devices such as goggles, snap-on-shades, or a hand-held eyepiece. The purpose of the mounting is to provide an eyepiece that covers most of the field of view of the user so that the majority of the light reaching the eyes of the user is that which has passed through the filter 7. The eyeglasses minimize the light reflected on the inside surface of the filter 7. The eyeglasses can be used when a search is required and can be stowed away when not used as is done with common sunglasses.

The embodiments of the invention in which an exclusive property or privilege is claimed are defined as follows:

1. A method for increasing the visibility of a white golf ball in a vegetative background, comprising the steps of;

looking at said vegetative background;

blocking about 90% of all light transmitted to the eye having a wavelength above 500 nanometer;

blocking less than 10% of all light transmitted to the eye having a wavelength below 500 nanometer, and blocking about 50% of all light transmitted to the eye having a wavelength of 500 nanometer.

* * * * *